United States Patent [19]

Charlton

[11] Patent Number: 4,705,943

[45] Date of Patent: Nov. 10, 1987

[54] ROTATIONAL OPTICAL ENCODER HAVING BINARY OUTPUT

[75] Inventor: Trevor G. Charlton, Swindon, England

[73] Assignee: Spectrol Reliance Limited, Swindon, England

[21] Appl. No.: 847,061

[22] Filed: Apr. 1, 1986

[30] Foreign Application Priority Data

Apr. 4, 1985 [GB] United Kingdom ............... 8508950

[51] Int. Cl.$^4$ .............................................. G01D 5/34
[52] U.S. Cl. ......................... 250/231 SE; 250/237 G
[58] Field of Search ................. 250/231 SE, 237 G; 340/347 P; 356/395

[56] References Cited

U.S. PATENT DOCUMENTS 3,842,261 10/1974 MacGovern et al. ............ 250/231
3,983,391 9/1976 Clemons ........................ 250/231 SE
4,152,589 5/1979 Mitchell ........................ 250/231 SE
4,247,769 1/1981 Warner ............................... 250/231

FOREIGN PATENT DOCUMENTS 0003153 7/1979 European Pat. Off. .
0066636 12/1982 European Pat. Off. .
1406287 9/1975 United Kingdom .
2005407 4/1979 United Kingdom .
2090655 7/1982 United Kingdom .
2128731 5/1984 United Kingdom .

Primary Examiner—David C. Nelms
Assistant Examiner—Stephone B. Allen
Attorney, Agent, or Firm—Stephen A. Schneeberger

[57] ABSTRACT

A rotational binary output encoder comprises a housing (1) defining an enclosed space (12), a shaft (3) extending through an end wall (1b) of the housing into the space (12) and having mounted on the inner end thereof a transparent planar disc member (7) having grid means (8) on one surface thereof and reflector means (6) on the other surface thereof, the grid means (8) having alternate areas (22,23) which allow or prevent the passage of light, light transmitting means (5) and light receiving means (4a,4b) mounted in said housing so that the grid means (8) intermittently interrupts the light passing from the light transmitting means (5) to the light receiving means (4a,4b) to produce opto-digital signals, and electric circuit means (10) for providing a digital electrical output from the opto-digital signals.

20 Claims, 4 Drawing Figures

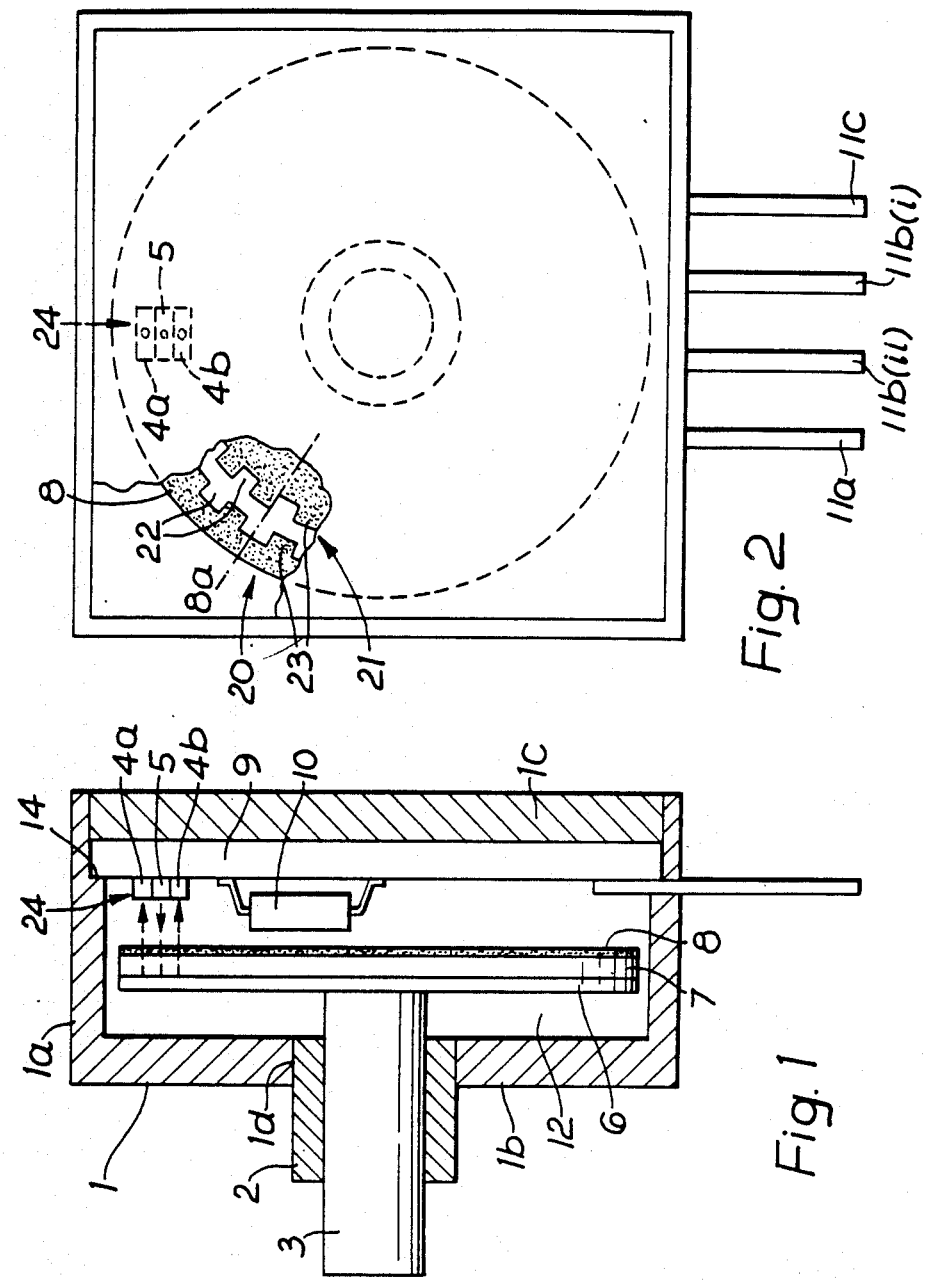

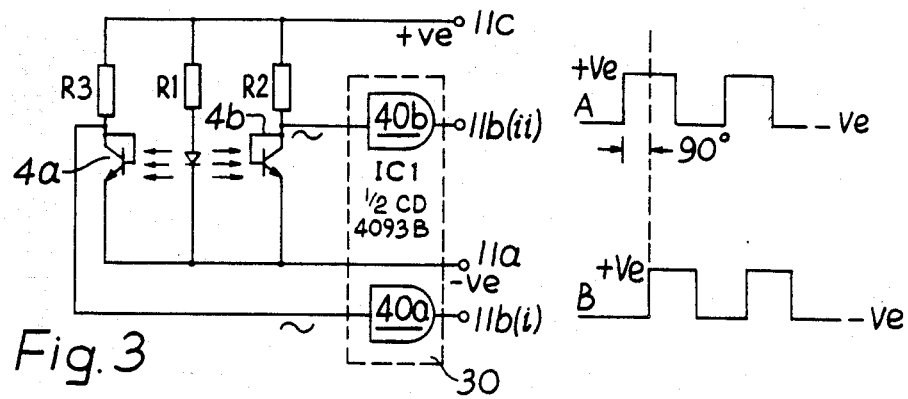
Fig. 3
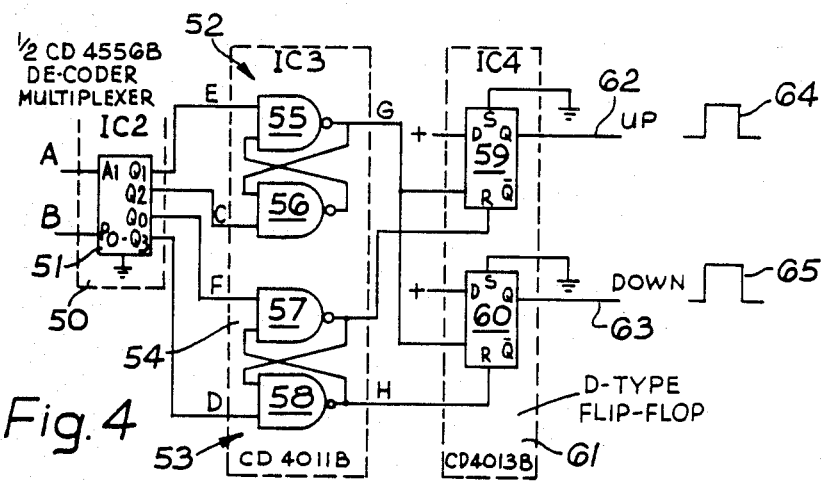
Fig. 4
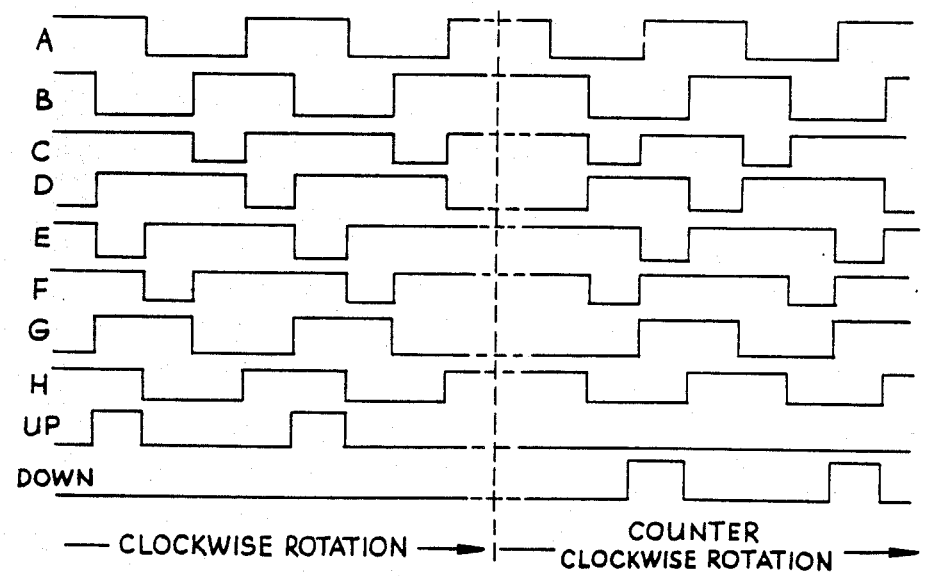

ROTATIONAL OPTICAL ENCODER HAVING BINARY OUTPUT

TECHNICAL FIELD

This invention relates to a rotational binary output encoder.

BACKGROUND ART

There is a need at the present time for a unitary panel mountable device that will provide an electrical digital output indicative of the mechanical rotation of a shaft. Known unitary panel mountable devices, such as potentiometers, are small in size and low in cost but suffer from the disadvantages that they provide an analogue output that is not directly compatible with the signal levels required in modern electronic circuitry and that they rely on electro-mechanical contacts with their inherent signal errors. Optical encoders are also known. Although optical encoders provide a digital output they are relatively large, are not panel mountable and are expensive in comparison with potentiometers.

DISCLOSURE OF INVENTION

The present invention has as its object to provide a rotational binary output encoder which is unitary, is panel mountable, can be small in size, is less expensive than known optical encoders and provides a digital output compatible with modern electronic circuitry.

The present invention provides a rotational binary output encoder comprising a housing defining an enclosed space, a rotatable shaft extending through the housing into said space, light transmitting and light receiving means mounted in said housing, grid means having alternating areas which allow or prevent the passage of light mounted in said housing in the path of travel of the light between said light transmitting and light receiving means, one of said light transmitting and light receiving means and said grid means being rotatable with said shaft so that the grid means intermittently interrupts the light passing from the light transmitting means to the light receiving means to produce opto-digital signals, and electric circuit means for providing a digital electrical output from said opto-digital signals.

Said housing may comprise a peripheral wall and opposed end walls and said shaft may extend centrally through one end wall. Said one end wall may have a bush mounted in an aperture therein and said shaft may be journalled in said bush.

Preferably reflector means is mounted in said housing in opposed spaced relation to said light transmitting and light receiving means, said reflector means serving to reflect light emitted by the light transmitting means back to the light receiving means, and said grid means is located between the light transmitting and light receiving means on the one hand and the reflector means on the other. Said grid means may be provided on one surface of a transparent planar member and said reflector means on the other surface of the planar member. Said transparent planar member may be in the form of a disc and may be mounted on said shaft for rotation therewith.

Said alternating areas of said grid means may be such as to provide a required number of opto-digital signals for each complete rotation of the transparent planar member.

Said light receiving means may comprise at least two light receiving elements and said grid means may comprise for each of the light receiving elements a different series of alternating areas which allow or prevent the passage of light, whereby to produce at least two series of opto-digital signals. Said at least two series of opto-digital signals may be out of phase with one another, whereby to indicate the direction of rotation of said shaft.

Said light transmitting means may comprise a light emitting diode and the light receiving means may comprise at least one phototransistor. Preferably the light receiving means comprises two photo-transistors which are arranged one on either side of the light emitting diode. The light emitting and light receiving means may comprise a hybrid opto-chip incorporating said light emitting diode and said phototransistor or photo-transistors. The light transmitting and light receiving means may be mounted on a substrate and said substrate may comprise an internal end wall of said housing.

Said electric circuit means may comprise a Schmitt trigger and may be mounted on said substrate.

BRIEF DESCRIPTION OF THE DRAWINGS

The present invention will be more particularly described with reference to the accompanying drawings, in which:

FIG. 1 is a side sectional elevation of one embodiment of a rotational binary output encoder according to the present invention;

FIG. 2 is a plan view, with the end wall partly broken away, of the rotational binary output encoder of FIG. 1;

FIG. 3 is a schematic circuit diagram of a Schmitt trigger for converting the sinusoidal waveform output of the light receiving means to a square waveform, and FIG. 4 is a circuit diagram of logic circuitry for determining the direction of rotation of a shaft.

BEST MODE FOR CARRYING OUT THE INVENTION

Referring to FIGS. 1 and 2 of the drawings it will be seen that the rotational binary output encoder illustrated therein comprises a housing 1 having a peripheral wall 1a and opposed end walls 1b, 1c, the housing defining an enclosed space 12. Mounted in an aperture 1d provided centrally of the end wall 1b is a bush 2 in which is journalled a shaft 3 which extends through the housing and into said space 12. Mounted on the inner end of the shaft 3 for rotation therewith is a disc-shaped planar tranparent member 7 having grid means 8 on one surface thereof and reflector means 6 on the other surface thereof. As will be seen more clearly in FIG. 2, the grid means 8 comprises two annular series of castellations 20, 21 which each provide areas 22 which will allow the passage of light alternating with areas 23 which prevent the passage of light. For a reason which will become apparent as the description proceeds, the series of castellations 21 is offset from the series of castellations 20 by half the width of a castellation as is indicated by the broken line 8a in FIG. 2.

The end wall 1c of the housing is a closure wall and is secured within the peripheral wall 1a in any suitable manner, e.g. as by means of a suitable adhesive. Mounted between the end wall 1c and a shoulder 14 provided on the internal surface of the peripheral wall 1a is a substrate 9 on which is mounted an opto-chip 24 comprising a light emitting diode 5 and a pair of phototransistors 4a, 4b which are arranged on either side of the light emitting diode 5, the phototransistor 4a being opposite the series of catellations 20 of the grid means 8 and the phototransistor 4b being opposite the series of castellations 21. Light from the light emitting diode 5 passes through the grid means 8 and the transparent planar member 7 to the reflector 6 and is then reflected back by the reflector 6 onto the photo-transistor 4a, 4b unless interrupted by the areas 23 of the series of castellations 20, 21. Thus, as the shaft 3 is rotated the disc assembly will also rotate and the light passing to the photo-transistors 4a, 4b will be intermittently interrupted by the grid means 8 to produce opto-digital signals which are translated into electrical signals by the photo-transistors 4a, 4b. Because the series of castellations 21 are offset from the series of castellations 20 by half the width of a castellation as previously referred to, there is a phase difference of 90° between the outputs of the photo-transistors 4a, 4b, and this phase difference is used to determine the direction of rotation of the shaft 3.

Although the castellations ar of rectilinear shape, the instensity of the light passing to the phototransistors 4a, 4b will vary in a sinusoidal manner as the grid is rotated. Accordingly, the electrical signals provided by the phototransistors 4a, 4b are sinusoidal in form. The outputs from the phototransistors, 4a, 4b are fed to a logic circuit mounted on the substrate 9 and indicated generally at 10 in FIG. 1. More specifically, referring to FIG. 3 the sinusoidal outputs of phototransistors 4a and 4b are extended to respective Schmitt triggers 40a and 40b. The Schmitt triggers 40a, 40b may be included as all or part of, an integrated circuit 30 which in turn is representative of all or part of, the logic circuit 10 of FIG. 1. Each of the Schmitt triggers 40a, 40b is responsive to the respective sinusoidal input signal to provide at its output a corresponding digital square wave having state-transitions at 0°, 180° and 360° of the sinusoid. Terminals 11a, 11b(i), 11b(ii) and 11c extend through the housing 1 and are connected to the logic circuit 10. Terminals 11a and 11c are connectable to a suitable voltage source whilst terminals 11b(i) and 11b(ii) are the outputs of Schmitt triggers 40a and 40b, respectively of the integrated circuit 30.

The square wave outputs A and B respectively which appear at the terminals 11b(ii) and 11b(i) are shown to the right of these terminals in FIG. 3. One of the square waveforms will lead the other by 90°, depending upon whether the direction of rotation of shaft 3 is clockwise or counterclockwise. These waveforms appearing on output terminals 11b(i) and 11b(ii) may be applied to circuitry located externally of housing 1, which circuitry is suitable for responding to the phase shift between waveforms to provide an indication of clockwise or counterclockwise rotation of shaft 3. Such circuitry may typically also provide a digital waveform output which is respresentative of the magnitude of shaft rotation in either the clockwise or counterclockwise direction.

One form of circuit for determining the direction of rotation of the shaft 3 by the phase angle between the outputs A and B is shown in FIG. 4. Referring to FIG. 4 it will be seen that the square wave outputs A and B are input to an integrated circuit 50 comprising a demultiplexer 51 which decodes each of the four discrete states represented by A and B. The output of demultiplexer 51 is used to set and reset a pair of flip-flops 52 and 53 incorporated in an integrated circuit 54. The flip-flop 52 comprises cross-coupled NOR gates 55, 56 whilst the flip-flop 53 comprises cross-coupled NOR gates 57, 58. The outputs E and C of demultiplexer 51, which correspond to A, are connected to the inputs of gates 55 and 56 respectively whilst the outputs F and D of demultiplexer 51 are connected to the inputs of gates 57 and 58 respectively. The output G and H of the flip-flops 52 and 53 respectively are used to clock D-type flip-flops 59 and 60 of an integrated circuit 61 which generates at its output terminals 62 and 63 respective up and down output pulses diagrammatically indicated at 64 and 65.

The output pulses at terminals 62 and 63 can be employed, e.g, as interrupt signals for micro-computers and/or for instrumentation control. If desired the resolution of the output pulses can be controlled by multiplication of the square waveform inputs A and B and using the rising and falling edges of the waveforms to produce edge triggered pulse logic.

What is claimed as new is:

1. A rotational binary output encoder comprising a housing defining an enclosed space, a rotatable shaft extending through the housing into said space, light transmitting and light receiving means mounted in said housing, a transparent planar member mounted in said housing and having grid means mounted on one surface thereof in the path of travel of light between said light transmitting and light receiving means, reflector means mounted on the other surface of said transparent planar member in opposed, spaced relation to said light transmitting and light receiving means either said light transmitting and light receiving means or said transparent planar member with said grid means being rotatable with said shaft so that the grid means intermittently interrupts the light passing from the light transmitting means to the light receiving means to produce opto-digital signals, and electric circuit means for providing a digital electrical output from said opto-digital signals.

2. A rotational binary output encoder according to claim 1 wherein said housing comprises a peripheral wall and opposed end walls and wherein said shaft extends centrally through one end wall.

3. A rotational binary output encoder according to claim 2 wherein said one end wall has a bush mounted in an aperture therein and wherein said shaft is journalled in said bush.

4. A rotational binary output encoder according to claim 1 wherein said transparent planar member is in the form of a disc and is mounted on said shaft for rotation.

5. A rotational binary output encoder according to claim 4 wherein said light receiving means comprises at least two light receiving elements and wherein said grid means comprises for each of the light receiving elements a different series of alternating areas which allow or prevent the passage of light, whereby to produce at least two series of opto-digital signals.

6. A rotational binary output encoder according to claim 5 wherein said alternating areas of said grid means are such as to provide a required number of opto-digital signals for each complete rotation of the transparent planar member.

7. A rotational binary output encoder according to claim 6 wherein the at least two series of opto-digital signals are out of phase with one another, whereby to indicate the direction of rotation of said shaft.

8. A rotational binary output encoder according to claim 1 wherein said light transmitting means comprises a light emitting diode and the light receiving means comprises at least one photo-transistor.

9. A rotational binary output encoder according to claim 8 comprising two said photo-transistors arranged one on either side of said light emitting diode.

10. A rotational binary output encoder according to claim 8 comprising a hybrid opto-chip incorporating said light transmitting and light receiving means.

11. A rotation binary output encoder according to claim 10 wherein said light transmitting and light receiving means are mounted on a substrate.

12. A rotational binary output encoder according to claim 11 wherein said electric circuit means is mounted on said substrate.

13. A rotation binary output encoder according to claim 12 wherein said electric circuit means comprises a Schmitt trigger.

14. A rotational binary output encoder according to claim 3 wherein said transparent planar member is in the form of a disc and is mounted on said shaft for rotation therewith.

15. A rotational binary output encoder according to claim 14 wherein said light receiving means comprises at least two light receiving elements and wherein said grid means comprises for each of the light receiving elements a different series of alternating areas which allow to prevent the passage of light, whereby to produce at least two series of opto-digital signals.

16. A rotational binary output encoder according to claim 15 wherein said alternating areas of said grid means are such as to provide a required number of opto-digital signals for each complete rotation of the transparent planar member.

17. A rotational binary output encoder according to claim 16 wherein the at least two series of opto-digital signals are out of phase with one another, whereby to indicate the direction of rotation of said shaft.

18. A rotational binary output encoder according to claim 17 wherein said light transmitting means comprises a light emitting diode and the light receiving means comprises at least one photo-transistor.

19. A rotational binary output encoder according to claim 18 comprising two said photo-transistors arranged one on either side of said light emitting diode.

20. A rotational binary output encoder according to claim 19 wherein said light transmitting and light receiving means and said electric circuit means are mounted on a substrate, said electric circuit means comprising a Schmitt trigger.

* * * * *